Feb. 27, 1934.                 W. J. BELL                    1,949,138
                      TRANSPARENT PRISMOIDAL MIRROR
                  Filed Jan. 2, 1929        2 Sheets-Sheet 1
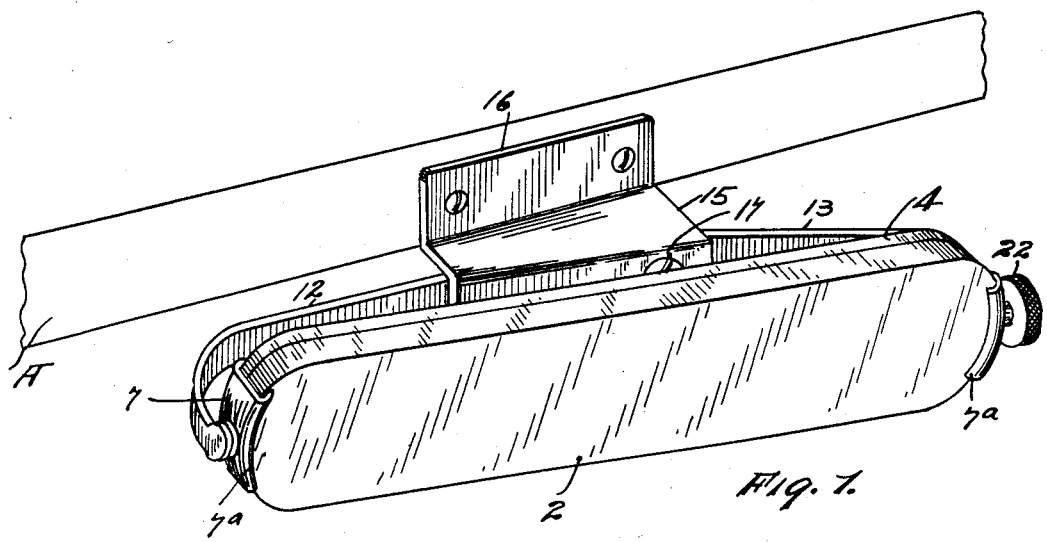
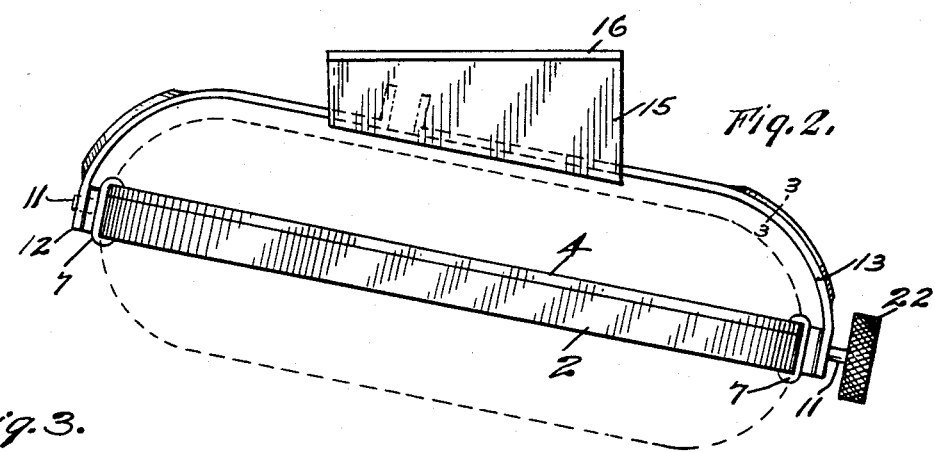
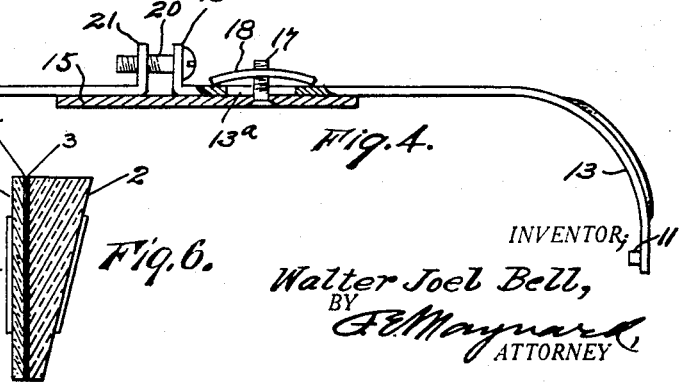
INVENTOR;
Walter Joel Bell,
BY
G. E. Maynard
ATTORNEY

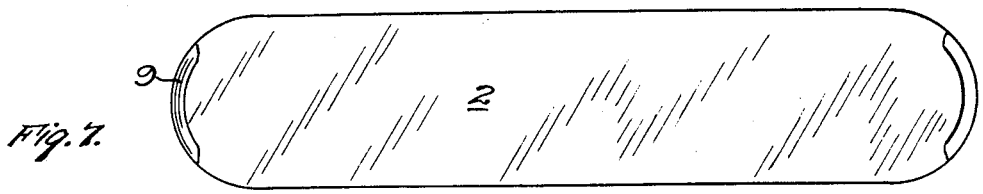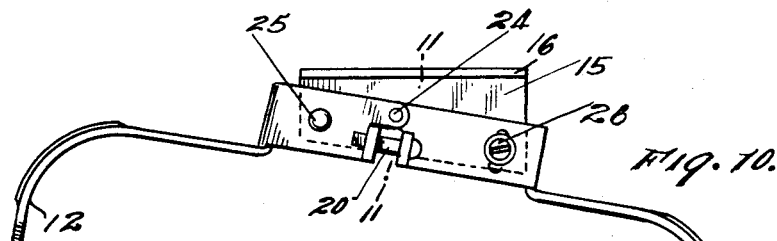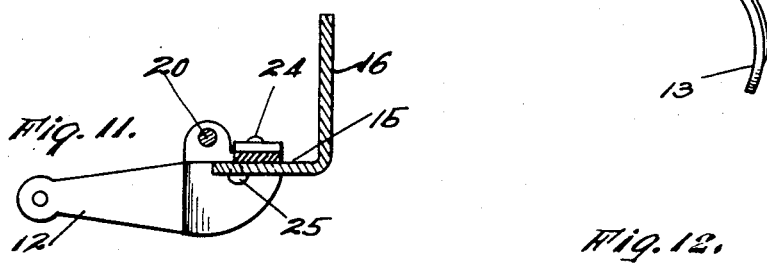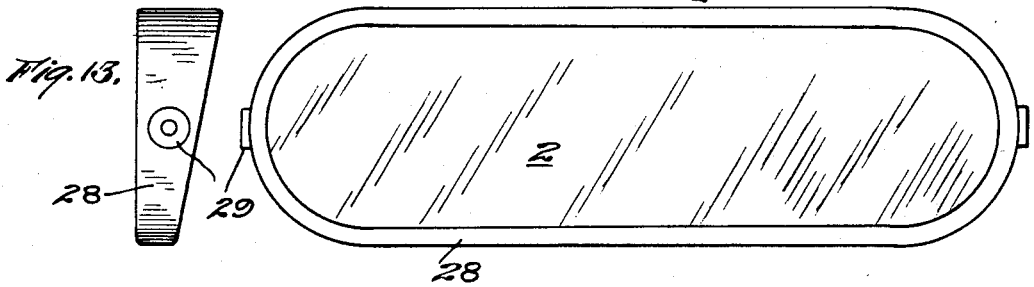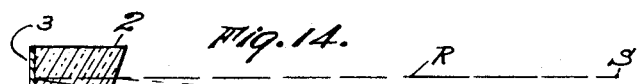

Patented Feb. 27, 1934

1,949,138

UNITED STATES PATENT OFFICE 1,949,138

TRANSPARENT, PRISMOIDAL MIRROR

Walter Joel Bell, Los Angeles, Calif.; Byron D. Bell executor of said Walter Joel Bell, deceased Application January 2, 1929. Serial No. 329,792

10 Claims. (Cl. 88—1)

This invention relates to vehicular accessories and more especially to a rear view device for day and night use.

The present invention is an improvement of the mirror set forth in my Patent No. 1,699,043 dated Jan. 15, 1929. In that patent the mirror included a translucent or colored screen set at an angle to a reflecting means, the purpose being to enable use of the colored screen to modify brilliant rays from lights of trailing vehicles.

In that patented mirror a clear mirror glass and a clear color glass were combined to form the modifying means. It is an object of the present invention to simplify the structure and yet achieve the same results of modified trailing-light reflection.

A further purpose served by the present invention is to provide a low cost, simplified and substantial mirror structure, and also provide a very handsome article.

Additional objects, advantages and features of construction and combination of means, and details will be made manifest in the ensuing description of the herewith illustrative apparatus; it being understood that modifications, variations and adaptations may be resorted to within the spirit, scope and principle of the invention as it is more directly claimed hereinafter.

Figure 1 is a perspective of the preferred form of the device, as installed for use.

Figure 2 is a plan thereof.

Figure 3 is a sectional elevation of a clamp arm, section on line 3—3, Figure 2.

Figure 4 is a horizontal, sectional view, in part, of the adjustable clamp arms.

Figure 5 is an edge view of a friction washer.

Figure 6 is a transverse section of a dual function mirror unit.

Figure 7 is a face view of a mirror glass.

Figure 8 is a longitudinal section of Figure 7, showing recessed clincher faces.

Figure 9 is a similar section showing bead clincher ends.

Figure 10 is a plan of a pivoted, unit clamp, for angular adjustment.

Figure 11 is a section on line 11—11 of Figure 10.

Figure 12 is a face view of a framed unit, and Figure 13 is an end view of the frame.

Figure 14 is a graphic illustration indicating the multi-image effect of a prismoidal reflector.

My present invention is an advance over the above mentioned patent in that for the purpose of obtaining a subdued reflection from a trailing, brilliant light instead of employing a colored transparent glass set at an angle to a spaced and separate reflector the instant device includes a prismoidal glass 2, preferably transparent and of any suitable chromatic characteristic, green being efficient, the glass having a plane back surface on or adjacent to which is disposed a reflecting media. This media preferably consists of a mirror coat 3, Figure 6.

Attention is now directed to Fig. 14 in which is schematically shown a light ray R from source S. This ray passes to the reflector 3 and by this is sent out on line #1 (disregarding refraction).

Due to the principle of interior reflection the beam R is partly reflected back from the front plane F of the glass 2 and, hitting the reflector 3, is cast out on line #2, and part of the beam on this line is reversed at the front plane of the glass and is sent back to the reflector 3, and so on according to the intensity of the light until the beam is so weakened that it will not pass out of the glass. The first reflected image on line #1 is the brightest and the successive images are each relatively dimmer. By making the triangular prismoid 2 of a light-subduing, transparent character a brilliant light can be observed in the glare reducer without blinding effect on the observer. It is understood that the prismoid may be of any appropriate material and of any desired form in plan and of any desired angle of obliquity between its forward and its rearward faces. A great advantage of this triangular prism is that sharp, distinct images are produced as in contrast to superimposition of reflections as occur if a multiplicity of transparent members are combined in angular relation.

For the purpose of making the device useable either day or night there is combined with the night mirror 2 a day mirror of any desired type or form and here shown as a clear colorless glass 4 with a reflector back 5 placed against back 3 of the night mirror 2, Fig. 6.

The composite rear vision device is so mounted that it can be instantly rotated on its longitudinal axis to present either face rearward.

Various means may be devised and employed for associating the mirrors 2—4 as a unitary device. They may be cemented back to back, or pierced by through bolts in an obvious manner, unnecessary to be illustrated.

The mirror device is suspended on end pivots in a suitable bracket permitting the mirror unit to be reversed face for face.

Figures 1 to 6, inclusive, illustrate a form of mount including end plates 7 having binding flanges 7ª to crimp onto the complementary ends of the glass device which, in Figures 7 and 8, are shown as having marginal recesses 9. This form of binding means permits of grinding the faces of the glass from end to end.

A modification of the marginal binding means is shown in Figure 9, wherein the glasses have corner beads 10 to match respective flanges 7ª of the end plates 7.

In the above form of mount only portions of the ends of the ornate glass are concealed.

The mount plates 7 are supported on pivots 11 and are pivotally clamped between bracket arms 12—13 which are capable of being set so as to press firmly against the plates 7 and frictionally hold them at any desired angle, as convenient to the observer. If desired friction washers 14 may be provided between the bracket arms and the mount plates 7.

To obtain the desired holding pressure of the arms 12—13 on the mirror device they are relatively adjustable, and while this may be by springing one toward the other, preferably one arm, as 12, is fixed on or rigid with a hanger 15 shown as including a back leaf 16 to be bolted or suitably attached to a convenient support A.

The arm 13 is adjustably clamped in any desired manner to the bracket 15, as by a screw 17 passing through a slot 13ª in the arm 13 and engaging a pressure bar 18 which can be drawn hard down on the arm 13 after this has been shifted over to firmly grip the mirror device.

A means is shown whereby to draw the shiftable arm 13 to effective position, and in the present form consists of a screw 20 passing free in an arm lug 13ᵇ and threading in a fixed part 21 which may be an up-turned end of the arm 12; this representing an economical construction.

If desired one pivot 11 may be extended and provided with a small knob 22 whereby to reverse the mirror device face for face.

In the form of hanger shown in Figure 10, the arms 12—13 are pivotally connected together by a pivot 24 so as to allow the arms to be closed onto the interposed mirror device by means of the contracting screw 20 connecting opposed parts of the arms. The arm assembly is adapted to be bodily angularly adjusted about a pivot 25 which connects the arm assembly to the hanger 15. By means of a suitable clamp instrumentality, as bolt or screw 26, the angularly arranged arms can be set tight at the desired position most convenient to the observer.

While the naked polished glass mirror device may be preferred for its inherent beauty, there is shown in Figures 12 and 13 a form in which the mirror set is bound in a narrow frame 28 with pivot bosses 29 for the friction washers 14.

By providing relatively adjustable clamp arms 12—13 to support the mirror unit I have eliminated clamp nuts and threads therefor on the trunnions which, thus, may be on the arms (Fig. 4) or on the mounts (Fig. 2) or any combination thereof.

What is claimed is:

1. In a vehicle driver's observation accessory a rear vision mirror device for night use including a transparent, chromo-prismoid with convergent front and back faces at such relative angles as to clearly isolate plural reflections of a common rear-field object.

2. In a vehicle driver's observation accessory a rear vision mirror device for night use including a transparent, chromo-prismoid with convergent front and back faces and having means at its back reflective through said prismoid, the faces being at a very material angle, relatively, and whereby to project plural, clearly isolated images of a back-field object.

3. In a vehicle driver's observation accessory a mirror glass having non-parallel front and back faces at one of which is a reflecting means reflective therethrough, and said faces having an angular relation which will cast multiple reflections, each clearly separated one from the other, of a back-field object when said glass is observed in the fore-field vision of the driver.

4. In a vehicle driver's observation accessory a mirror glass having front and rear faces which are relatively inclined, and means reflecting therethrough, the degree of angle between the faces being such as to cause clearly distinguishable images of a common back-field object to be cast by said means.

5. In a vehicle driver's observation accessory a mirror glass having a reflective back face and a front face at such an angle to the back as to transmit a plurality of clearly isolated images at different angles and of different intensities from an observed reflected object.

6. In a vehicle driver's observation accessory a rear vision mirror including a reflector having a prismatic body whose rear face is oblique to the front face and is visible through the body from front to rear; whereby from a single point of vision selective images are viewable of a single object, upon relative adjustment of the mirror body as to the object and observer, the included angle between the faces being such as to definitely isolate the images in respective line from the reflective face.

7. A night-use, glare-reducing vehicle accessory adapted to be arranged in the fore-view of the vehicle driver and including a rear view mirror consisting of a wedge-shaped transparent colored prism having a reflective media on one face, the angle of the wedge being greater than five degrees of arc so as to effect a clear separation of reflected images of a common rear-field object.

8. In a device of the class described, a rear-view mirror including a transparent prismoid having a reflective back and a face which is materially oblique thereto for projection of isolated images of different intensity due to interior reflection of the prismoid, and means by which the latter is mounted in observation range of the driver of a vehicle.

9. In a device of the class described, a rear-view mirror including a transparent prismoid having a reflective back and a face which is materially oblique thereto for projection of isolated images of different intensity due to interior reflection of the prismoid, and means by which the latter is mounted in observation range of the driver of a vehicle, and providing for angular adjustment of the mirror for selection of respective images as desired.

10. In an automotive vehicle, a rear view mirror which consists of a sheet of glass having a plane mirrored surface and a plane surface arranged at such an angle to the mirrored surface that the beams of light reflected from said surfaces are separated by a relatively large distance at the distance of the driver's eye from the mirror.

WALTER JOEL BELL.